UNITED STATES PATENT OFFICE.

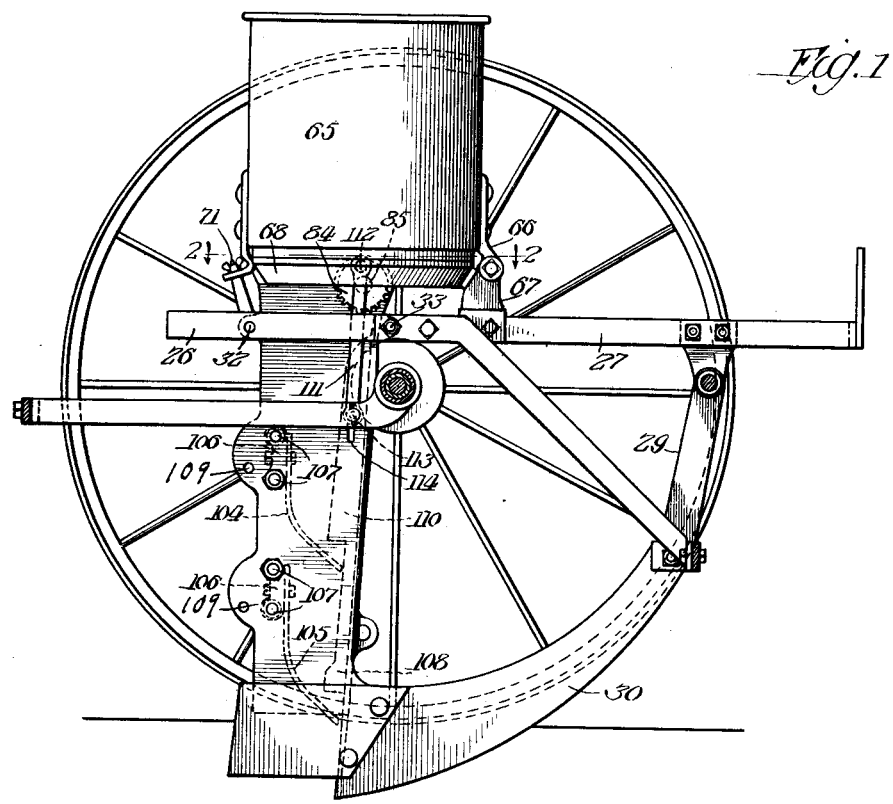

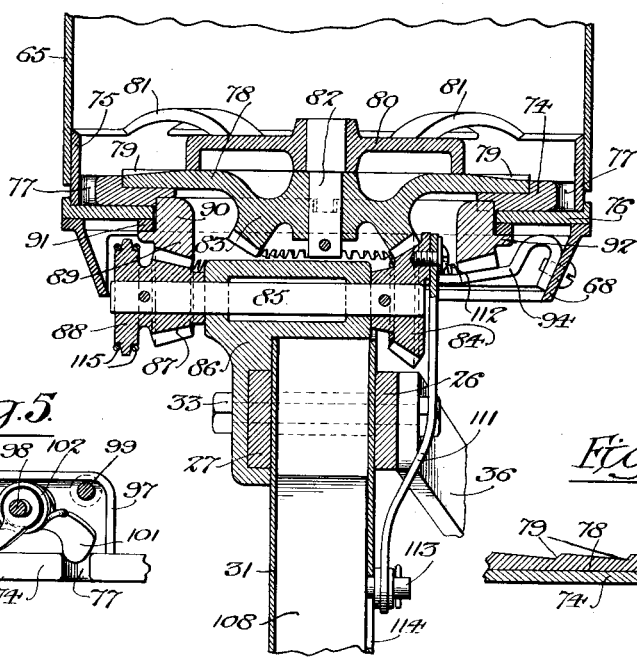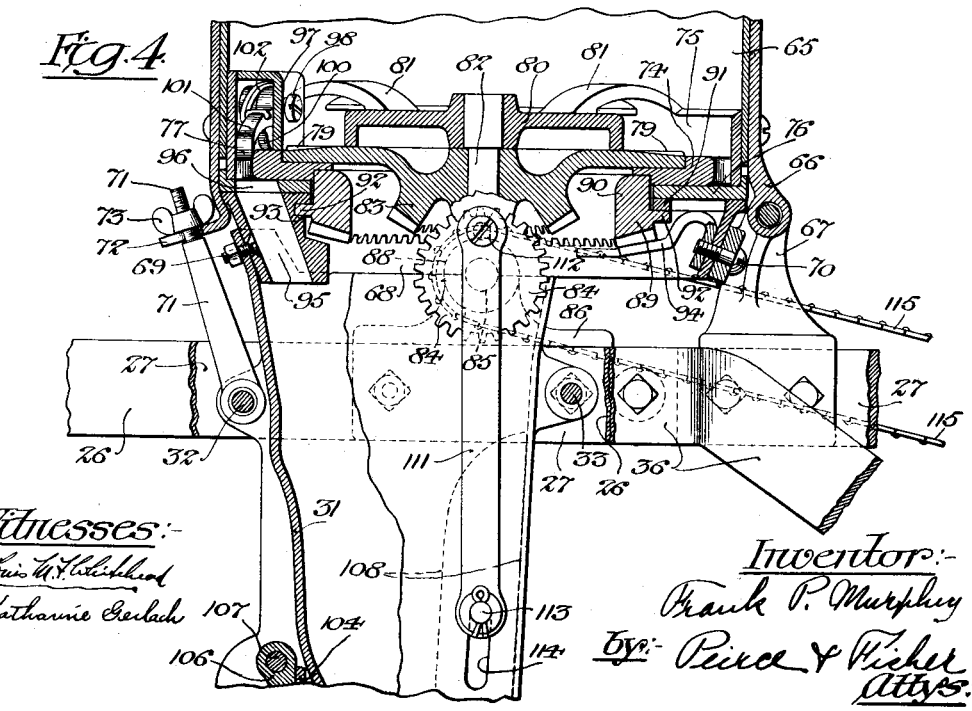

FRANK P. MURPHEY, OF DECATUR, ILLINOIS, ASSIGNOR TO EMERSON-BRANTINGHAM COMPANY, OF ROCKFORD, ILLINOIS, A CORPORATION OF ILLINOIS.

CORN-PLANTER.

1,076,145. Specification of Letters Patent. Patented Oct. 21, 1913.

Application filed December 19, 1907. Serial No. 407,111.

*To all whom it may concern:*

Be it known that I, FRANK P. MURPHEY, a citizen of the United States, and a resident of Decatur, county of Macon, State of Illinois, have invented certain new and useful Improvements in Corn-Planters, of which the following is a specification.

The invention relates to corn planters and more particularly to the seed delivery mechanism therefor and seeks to provide improved means for accurately feeding the kernels to the single cells of the seed plate, and to provide improved valve mechanism for delivering the accumulated kernels from the boot.

The invention consists in the features of improvements hereinafter set forth, illustrated in the preferred form in the accompanying drawings and more particularly pointed out in the appended claims.

In the drawings, Figure 1 is a view in section of a corn planter to which the present improvements are applied. Fig. 2 is a plan view of the improved seeding mechanism with parts in section on the line 2—2 of Fig. 1. Figs. 3 and 4 are sections on the lines 3—3 and 4—4 respectively of Fig. 2, and Figs. 5 and 6 are detail sections on the lines 5—5 and 6—6 respectively of Fig. 2.

The machine frame may be of any suitabl type. In the form shown, the improved seeding mechanism is mounted on frame bars 26 and 27. A depending brace bar 29 is connected to the forward end of a furrow-opening shoe 30 and the rear end of the shoe is connected to the lower end of a boot 31. The upper end of the boot extends between the frame bars 26 and 27 and is connected thereto by bolts 32 and 33 (see Fig. 4).

The seed box or hopper 65 is connected by a hinge piece 66 to a bracket 67 on the bar 27. A support 68 for the seed box is connected by screws 69 and 70 to the upper end of the boot or discharge chute 31 and to the bracket 67. The seed box is held in normal position by a bolt 71 pivoted on the cross-bolt 32 and arranged to engage a slotted lug 72 on the feed box. A winged nut 73 on the bolt 71 is arranged to engage the lug 72 and securely hold the seed box in position.

The rotary seed plate 74 is arranged within a ring 75 in the lower portion of the seed box and rests upon an annular plate 76 forming the bottom of the box. The seed plate is provided in its edge with a circular or elliptical series of seed cells 77 that are adapted to receive single kernels edgewise.

An agitator plate or disk 78 is arranged within the circular series of cells and this agitator plate is preferably recessed in the upper face of the seed plate as shown in Fig. 4 so that the upper faces of the seed plate and agitator plate are substantially in the same plane. The seed and agitator plates are concentrically arranged and the agitator plate is provided on its upper face with a number of projecting, spiral ribs 79 which are arranged to force the kernels outwardly into the cells of the plate.

The seed plate and the agitator plate are held in position in the bottom of the seed box by a cap plate 80 which is connected to the ring 75 by a series of cross pieces 81 and the agitator plate is journaled as shown upon a stud 82 depending from the cap plate. A beveled gear 83 formed on the under side of the agitator plate 78 is arranged to engage the teeth of a beveled gear 84 that is fixed to one end of a short horizontal shaft 85 that is fixed to the outer side bar 27 of the auxiliary frame. At its outer end, the shaft 85 is provided with a beveled gear 87 and a sprocket wheel 88 which are preferably formed in one piece as shown in Fig. 3. The small beveled gear or pinion 87 meshes with a large horizontal, beveled gear 89. This gear 89 is provided with an upwardly projecting flange 90 which extends through a ring 91 in the upper portion of the fixed box support 68 and through a central opening in the feed-box bottom 76 into engagement with the seed plate 74. Any suitable arrangement of interlocking lugs and notches may be provided between the seed plate 74 and the flange 90 of the gear 89 so that the seed plate is rotated with the gear. Gear 89 is provided with an outwardly projecting flange 92 which abuts against the under side of the ring 91 and which, at one side, engages a groove 93 formed in the seed box support 68. At the opposite side, the gear 89 is upheld in position by a pair of supporting arms 94 that are secured to the flange of the seed box support 68.

The seed box support 68 and the seed box bottom 76 are provided with registering discharge openings 95 and 96 respectively which lead to the discharge boot or chute 31. A cut-off casing 97 is arranged within the seed box above the discharge openings 95 and 96 and above one portion of the seed plate. This casing 97 is secured to the ring 75 at the bottom of the seed box by a pair of bolts 98 and 99. Upon the bolt 98, which extends through the central portion of the cut-off casing, is mounted a cut-off 100 and an ejector 101. The parts are pivoted on the bolt 98 and extend downwardly toward the seed plate in opposite directions. A spring 102 coiled upon the hubs of the cut-off and the ejector has its ends bent respectively over these parts so that the cut-off and ejector are yieldingly held into engagement with the seed plate 74. The cut-off 100 is arranged to remove any kernels in excess of one in the seed cell 77 and project the same outwardly through an opening 103 in the cut-off casing 97 back into the seed box. The ejector 101 is arranged to project successively into the seed cells 77 and force the kernels therefrom through the discharge openings 96 and 95 into the discharge chute 31.

Upper and lower valves are arranged within the discharge chute 31 and these valves preferably consist of plates 104 and 105 see Fig. 1 of spring metal that are secured at their upper rear edges to brackets 106, each of which is secured in position within the boot or chute 31 by a pair of pins 107.

When the planter is used for check-row planting the spring plates or valves 104 and 105 are arranged as shown in Fig. 1 with the lower front edge of the valve 105 engaging the front wall of the discharge chute 31 and with the lower front edge of the valve 104 engaging a valve-operating member or plunger 108. The lowermost pin 107 of each pair may be removed and the valve or spring plates 104 and 105 can then be swung backwardly and held in inoperative position by reinserting the pins in the holes 109. The valves are so shifted to inoperative position when the planter is to be used for drill planting. In check-row planting the valves 104 and 105 are operated by the reciprocating plunger 108 which is arranged against the front wall of the discharge chute and fits snugly between the side walls thereof. The lower valve 105 is operated by the lower end of the plunger 108 while the upper valve 104 is operated by a shoulder 110 formed on one face of the plunger. The plunger is operated by a connecting rod 111 (see Fig. 3) which is connected at its upper end to an eccentric crank pin 112 on the gear 84 and at its lower end to a pin 113 which is fixed to the upper end of the valve-operating plunger 108 and projects outwardly therefrom through a vertical slot 114 in the side wall of the discharge chute or boot 31.

The seeding mechanism is driven by a chain 115 which passes over the sprocket wheel 88. This chain is driven in any suitable manner from the supporting wheels of the planter through the medium of the usual clutch mechanism controlled by the check-row forks. At each operation of the machine the shaft 85 is rotated through a single revolution. This movement of the shaft is sufficient to rotate the seed plate through one-quarter of a revolution and the kernels are accumulated, one at a time, in the well known manner upon the upper valve 104 of the discharge chute. The movement of the shaft also reciprocates the plunger 108 and the shoulder 110 thereon forces the kernels previously accumulated on the upper valve 104 down on to the lower valve 105. The kernels on the lower valve 105 are, at the same time, forced outwardly by the lower end of the plunger into the ground.

The gears 84 and 83 for rotating the agitator plate or disk 78 are so arranged that the agitator plate is driven in a direction opposite to that in which the seed plate 76 rotates, as indicated by the arrows in Fig. 2. The agitator plate is also driven at a higher rate of speed than is the seed plate. By this arrangement, the spiral ribs 79 on the agitator plate will effectively force the kernels outwardly into the seed cells 77 so that each cell is properly charged with a single kernel and uniform planting is assured. In drill planting, the valves 104 and 105 in the discharge chute are shifted rearwardly to inoperative position, as described.

It is obvious that changes may be made in the details set forth without departure from the essentials of the invention, as defined in the claims.

Having described my invention, what I claim as new and desire to secure by Letters Patent, is:—

1. In a corn planter, the combination with a horizontal rotary seed plate having a circular series of cells formed in its outer edge and adapted to receive single kernels edgewise, of a horizontal rotary agitator plate set within said series of cells and having a number of spiral ribs for forcing the seed outwardly toward said cells, and mechanism for continuously rotating said seed plate and said agitator plate in opposite directions, substantially as described.

2. In a corn planter, the combination with a horizontal rotary seed plate having a series of cells formed in its outer edge and adapted to receive single kernels edgewise, of a cap plate above said plate, a horizontal rotary agitator plate arranged between said cap plate and said seed plate and having a series of ribs for forcing the seed outwardly toward said cells, and mechanism for continuously rotating said seed plate and said agitator plate in opposite directions, substantially as described.

3. In a corn planter, the combination with a seed plate having a circular series of cells, of an agitator plate arranged within said circular series of cells, the upper faces of said seed and agitator plates being substantially in the same plane, said agitator plate having a number of projecting ribs on its upper face for forcing the seed outwardly toward said cells, substantially as described.

4. In a corn planter, the combination with a rotary seed plate having a series of cells in its outer edge adapted to receive single kernels edgewise, of a rotary agitator plate arranged within said series of cells, the upper faces of said seed and said agitator plates being substantially in the same plane, and said agitator plate having a series of projecting spiral ribs on its upper face for forcing the seed outwardly toward said cells, substantially as described.

5. In a corn planter, the combination with a rotary seed plate having a circular series of cells, of a rotary agitator plate arranged within said circular series of cells, the upper faces of said seed and said agitator plates being substantially in the same plane, said agitator plate having a series of spiral, projecting ribs on its upper face for forcing the seed outwardly toward said cells, and mechanism for rotating said seed and said agitator plates in opposite directions, substantially as described.

6. In a corn planter, the combination with a horizontal, rotary seed plate having a circular series of cells in its outer edge adapted to receive single kernels edgewise, of a concentric, horizontal, rotary agitator plate recessed in the upper face of said seed plate and having a series of spiral ribs on its upper face for forcing the seed outwardly toward said cells, substantially as described.

7. In a corn planter, the combination with a horizontal rotary seed plate having a circular series of cells in its outer edge adapted to receive single kernels edgewise, of a cap plate above said seed plate, a concentric, horizontal, rotary agitator plate beneath said cap plate and recessed in the upper face of said seed plate, said agitator plate having a series of spiral ribs on its upper face for forcing the seed outwardly toward said cells, and mechanism for continuously rotating said seed and agitator plates in opposite directions, substantially as described.

8. In a corn planter, the combination with a rotary seed plate having a circular series of cells, of a concentric, rotary agitator plate arranged within said series of cells and having its upper face substantially in the same plane with the upper face of said seed plate, and means for driving said seed plate and said agitator plate in opposite directions, said agitator plate being provided with a series of spiral ribs that are rearwardly and outwardly inclined in a direction opposite to that in which said agitator plate rotates, substantially as described.

9. In a corn planter, the combination with a seed hopper and coöperating discharge chute, of a shaft journaled below said seed hopper, a seed plate in the seed hopper geared to the shaft, a discharge valve in said chute, a reciprocable member adapted to actuate said discharge valve, a crank arm rotatable with rotation of said shaft and having a connection with said reciprocable member to reciprocate same upon rotation of said shaft.

10. In a corn planter, the combination with a seed hopper and discharge chute, of a seed plate rotatable in the seed hopper, a rotatable member in gear connection with said seed plate, a discharge valve in said chute, a reciprocable plunger adapted to actuate said discharge valve, a link in connection with said plunger and being eccentrically connected to said rotatable member, and means for rotating said seed plate to rotate said member and reciprocate said plunger.

11. In a corn planter, the combination with a seed hopper and a discharge chute, of a seed plate rotatable in the seed hopper, a discharge valve in said chute, a member rotatable with rotation of said seed plate, and means connected to said rotatable member eccentrically, being in operable relation with said discharge valve and adapted to be reciprocated by rotation of said member and through said eccentric connection to operate said discharge valve.

12. In a corn planter, the combination with a seed hopper and discharge chute, of a shaft journaled below said seed hopper, a seed plate in said seed hopper geared to said shaft, a discharge valve in said chute, a plunger reciprocable in the chute to actuate said discharge valve, and an eccentric connection between said shaft and plunger, the rotation of said shaft rotating the eccentric connection and reciprocating said plunger to actuate said valve.

13. In a corn planter, the combination with a seed hopper and a discharge chute, of a shaft journaled below said seed hopper, a gear upon said shaft, a seed plate in the seed hopper in a gear connection with said gear, a discharge valve in said chute, a plunger reciprocable to actuate said discharge valve, a crank arm connecting said gear and plunger, and means for rotating said shaft.

14. In a corn planter, the combination with a seed hopper and a coöperating discharge chute, an upper and a lower discharge valve in said discharge chute, each valve being movable independently relative to the other, a reciprocable plunger in the chute having an ejecting shoulder for each valve, and means for reciprocating said plunger to approximately simultaneously actuate said valves.

15. In a corn planter, the combination with a seed hopper and a coöperating discharge chute, of a seed plate rotatable in the hopper, a shaft having a driving connection with the seed plate to rotate same, discharge valve means in the discharge chute including a reciprocable member, a rotatable member having a driving connection with said shaft, and a link connected to said reciprocable member and having a connection with said rotatable member eccentric from the axis thereof, whereby upon rotation of said shaft said valve member may be reciprocated through rotation of said rotatable member.

16. In a corn planter, the combination with seed feeding mechanism and a coöperating discharge chute, of discharge valve means including a reciprocable member, a rotatable member, and a link connection between the rotatable member and reciprocable member for imparting a reciprocating movement to said valve member by rotation of said rotatable member.

FRANK P. MURPHEY.

Witnesses:
ELLA HAGENON,
KATHARINE GULACH.

Copies of this patent may be obtained for five cents each, by addressing the "Commissioner of Patents, Washington, D. C."